United States Patent Office 2,894,021
Patented July 7, 1959

2,894,021

PROCESS FOR PURIFICATION OF DIMETHYL TEREPHTHALATE

Erhard Siggel, Laudenbach am Main, Germany, assignor to Vereinigte Glanzstoff-Fabriken, A.G., Wuppertal-Elberfeld, Germany No Drawing. Application December 11, 1956
Serial No. 627,576

Claims priority, application Germany December 12, 1955

6 Claims. (Cl. 260—475)

The invention relates to a process for purification of dimethyl terephthalate.

Crude dimethyl terephthalate, as obtained either through esterification of terephthalic acid or by the depolymerization of polyethylene terephthalate, cannot be adequately purified by recrystallization or by distillation in a vacuum. A simple distillation at atmospheric pressure likewise fails to give a complete purification because the dimethyl terephthalate partially decomposes at the high distillation temperatures.

It has been proposed that the distillation of the dimethyl terephthalate be carried out in a continuously executed process in three distillation zones. In this process, the separation of non-distillable impurities is successfully accomplished, which remain in the reaction vessel. However, it is not possible by this method to separate completely the products that form during the distillation and that appear as impurities. Furthermore, extensive apparatus is required to carry out this method of purification. Accordingly, with the purification methods hitherto known, a thoroughly purified dimethyl terephthalate cannot be obtained. As experience has shown, even slight traces of impurities disturb the condensation of dimethyl to polyethylene terephthalate quite susceptibly.

An object of the present invention is to provide a process for purification of dimethyl terephthalate whereby a product of higher purity and better condensation properties can be obtained than has heretofore been possible.

Another object of the invention is to provide a process for purificaiton of dimethyl terephthalate which is easily and efficiently carried out at normal pressures while producing a product having a high degree of purity.

These and other objects and advantages of the invention will become more apparent upon consideration of the following detailed description of the invention.

It has now been found, in accordance with the invention, that crude dimethyl terephthalate can be thoroughly purified at atmospheric pressure, if the dimethyl terephthalate in its crude liquid or molten state is condistilled by passing an inert vapor stream of an aromatic compound therethrough. Aromatic compounds which have been found to be particularly suitable in the practice of the invention include inert aromatic and hydroaromatic hydrocarbons, or mixtures thereof, and these hydrocarbons can be unsubstituted or substituted with methyl groups, but should not contain reactive substituents. Those compounds are preferably selected which have a boiling point between about 80° C. and 260° C. Suitable compounds include, e.g., benzene, toluene, xylene, tterahydronaphthalene, methylnaphthalene, diphenyl, diphenyloxide.

In the preferred form of the process, the vapors of the inert compound are preheated to about 200° C. up to 260° C., and are then conducted or passed through a distillation vessel which is filled with the crude dimethyl terephthalate, preferably maintained in its molten state at about 270° C. to 273° C. Although the boiling point of dimethyl terephthalate is about 285° C., a mixture is advantageously continuously distilled over at a temperature of from about 250° C. to 260° C., the mixture consisting essentially of about 75% dimethyl terephthalate and about 25% of one of the compounds designated above. The distillate mixture is then cooled to form a hard crystalline sludge which is worked into flakes and washed with a small portion of a pure aromatic compound such as for example, toluene. The last traces of the aromatic compound are eliminated by drying, which preferably follows the washing immediately. The dimethyl terephthalate product shows a very high degree of purity, so that it can immediately be used for transesterification, i.e., an interchange of ester radicals, and consequently a condensation to polyethylene terephthalate. The polycondensate produced is very clear and can be easily processed into the threads and fibers of highly uniform quality.

If, instead of the vapors of aromatic compounds, compounds of other vapors, e.g., methanol vapor, are employed, then no purification in the sense described above takes place because a sublimation of dimethyl terephthalate occurs.

The following example further illustrates the invention but is not intended to be exclusive. For example, aromatic compounds other than toluene can be employed for condistillation according to the example to give equivalent results.

*Example*

A distillation vessel is filled with crude dimethyl terephthalate which has been heated to form a molten material maintained at a temperature of about 270° C. to 273° C. During the condistillation, a vapor stream of toluene, preheated to 255° C., is conducted through the molten material in the distillation vessel at a rate of 800 cc. of toluene per hour. The distillation vessel is continuously filled with molten crude dimethyl terephthalate. The rate of distillation corresponds to about 2.5 kg. of dimethyl terephthalate per hour. The control of the distillation temperature is accomplished by adjusting the temperature of the toluene vapors introduced, for example, at about 255° C. Thereby, the distillation temperature, i.e., the temperature in the distillation vessel, is automatically set at about 260° C. 2.5 kilograms of dimethyl terephthalate and 0.8 kilogram of toluene per hour are distilled over. The distilled mixture shows no tendency toward sublimation of the dimethyl terephthalate, so that it is not necessary to provide an additional heating of the tubes. The vapors are condensed on a cooled roller. The crystal sludge developed on the roller is reduced to flake form, washed with a small quantity of pure toluene and immediately dried.

The invention is hereby claimed as follows:

1. A process for purification of dimethyl terephthalate which comprises condistilling a liquid molten crude dimethyl terephthalate at an elevated distillation temperature of at least 200° C. and below 285° C. with an inert aromatic compound selected from the group consisting of aromatic and hydroaromatic hydrocarbons passed in vapor phase through the crude dimethyl terephthalate.

2. A process for purification of dimethyl terephthalate which comprises condistilling at substantially atmospheric pressure a liquid molten crude dimethyl terephthalate at a distillation temperature of from about 250° C. to 260° C. with an inert aromatic compound selected from the group consisting of aromatic and hydroaromatic hydrocarbons having a boiling point between about 80° C. and 260° C. passed in vapor phase through the crude dimethyl terephthalate.

3. A continuous process for purification of dimethyl terephthalate which comprises maintaining a crude dimethyl terephthalate in its liquid molten state at a temperature of about 270° C. to 273° C., continuously supplying said liquid crude to a distillation zone, and condistilling at substantially atmospheric pressure said liquid crude in said distillation zone at a distillation temperature of from about 250° C. to 260° C. with an inert aromatic compound selected from the group consisting of aromatic and hydroaromatic hydrocarbons having a boiling point between about 80° C. and 260° C., said aromatic compound being preheated for adjustment of said distillation temperature and passed in vapor phase through the crude dimethyl terephthalate.

4. A process as defined in claim 2 wherein the inert aromatic compound is toluene.

5. A continuous process for purifying dimethyl terephthalate which comprises maintaining a crude dimethyl terephthalate in its liquid molten state at a temperature below 285° C., continuously supplying said liquid molten crude to a distillation zone, and condistilling said liquid molten crude in said distillation zone under substantially atmospheric pressure at a distillation temperature of from about 250° C. to 260° C. with toluene, said toluene being preheated for adjustment to said distillation temperature and passed in vapor stage through the crude dimethyl terephthalate.

6. A continuous process as claimed in claim 5 wherein said condistillation yields a distillate mixture consisting essentially of about 75% dimethyl terephthalate and 25% toluene.

References Cited in the file of this patent
UNITED STATES PATENTS

| | | |
|---|---|---|
| 1,864,893 | Crowell et al. | June 28, 1932 |
| 2,005,381 | McDougal | June 18, 1935 |
| 2,091,241 | Kvalnes | Aug. 24, 1937 |
| 2,778,849 | Ackelsberg | Jan. 22, 1957 |
| 2,802,860 | Stack et al. | Aug. 13, 1957 |